United States Patent Office 3,365,403
Patented Jan. 23, 1968

3,365,403
PROCESS OF PRODUCING SOLUTIONS OF METAL SOAPS OF EPOXIDIZED FATTY ACIDS IN AN ALKYL PHENOL
Alfred Szczepanek, Duren-Rolsdorf, and Günter Koenen, Duren, Germany, assignors to Chemische Fabrik Hoesch K.-G., Duren, Germany
No Drawing. Filed Apr. 1, 1963, Ser. No. 269,755
Claims priority, application Germany, Apr. 2, 1962, C 26,632
17 Claims. (Cl. 252—400)

The present invention relates to a valuable process of producing highly concentrated solutions of metal salts of epoxidized acids and more particularly of metal soaps of epoxidized fatty acids in alkyl phenols, and to the products and compositions obtained thereby.

Highly concentrated solutions of metal soaps of epoxidized fatty acids in alkyl phenols, preferably in mixture with organic solvents, have proved to be valuable liquid stabilizers for halogen-containing thermoplastics, especially for polyvinyl chloride and polyvinyl chloride copolymers. Such liquid stabilizers were prepared heretofore by dissolving preformed metal soaps of epoxy fatty acids, preferably in mixture with metal soaps of branched synthetic aliphatic carboxylic acids, in suitable solvents or solvent mixtures.

The only process known of producing such metal soaps of epoxidized fatty acids consists in metathetically reacting the alkali metal salts of such epoxidized fatty acids with water-soluble inorganic salts of the desired metals. Direct reaction of metal oxides or hydroxides with free epoxidized fatty acids in the molten state is not possible due to the tendency of such acids to cracking, cleavage of the epoxy group, and polymerization. When proceeding according to the known metathetical process, said reaction has a stabilizing effect upon the epoxidized fatty acids and thus permits preparation of their metal soaps.

In contrast thereto, stable carboxylic acids and naphthenic acids react readily with metal oxides or hydroxides in the molten state, even in the presence of organic solvents. In this manner it is possible to obtain directly solutions of their metal soaps. As stated above, this process cannot be employed in producing metal soaps of epoxidized fatty acids because the epoxy group is highly sensitive to higher temperatures, i.e. to reaction in the molten state.

Moreover, the organic solvents which are used in this known process are unsuitable for reaction of epoxy fatty acids with metal oxides or metal hydroxides. This is due to the low solubility of the resulting metal soaps of epoxy fatty acids in such solvents and especially in solvents as they are used for preparing lacquer solutions, such as aromatic or aliphatic hydrocarbons, alcohols, esters, or ketones. When using such solvents, the metal soaps of the epoxy fatty acids precipitate during reaction and form a coating on the metal compound reactants which are insoluble in such solvents. As a result thereof no complete reaction of said metal compounds with the epoxy fatty acid can be achieved.

It is one object of the present invention to provide a simple and highly effective process of producing metal soaps of epoxy fatty acids which process permits the use of oxides or hydroxides of monovalent or bivalent metals or of their slats with volatile acids, is free of the disadvantages of the known processes, and yields the desired metal soaps of epoxy fatty acids in solution in a high yield and without any decomposition, degradation, cleavage of the epoxy group, and/or polymerization.

Another object of the present invention is to provide new and valuable solutions of metal salts of epoxy fatty acids in alkyl phenols which are useful liquid stabilizers for halogen-containing thermoplastics and especially for polyvinyl chloride and its copolymers.

A further object of this invention is to provide stabilized halogen-containing thermoplastics and especially polyvinyl chloride thermoplastics and its copolymers.

Other objects of the present invention and advantageous features thereof will become apparent as the description proceeds.

In principle, the present invention comprises the reaction of free epoxy fatty acids or of their esters of monovalent or polyvalent alcohols with oxides or hydroxides of monovalent or bivalent metals or their salts with volatile acids in the presence of alkyl phenols at a temperature below 100° C. whereby any volatile reaction product is simultaneously removed by operating under reduced pressure. It is highly surprising that free epoxy fatty acids or their esters react with said metal compounds in the presence of alkyl phenols because it is known that phenolic hydroxyl groups readily react with vicinal epoxides in the presence of acids or bases.

According to another embodiment of the present invention mixtures of metal soaps of epoxy fatty acids with metal soaps of branched aliphatic carboxylic acids, preferably of synthetic acids can be prepared directly according to the present invention by using alkyl phenols as solvents. Such mixtures are of considerable importance for many purposes. It is quite surprising and could not be expected that this reaction could be carried out without difficulty because it is known that the carboxyl groups of such branched aliphatic carboxylic acids react readily with the epoxy groups of epoxy fatty acids at a temperature as required for dissolving the metals soaps, i.e. at a temperature between about 120° C. and about 140° C.

The use of alkyl phenol as reaction medium and diluting agent during formation of the epoxy fatty acid soaps according to the present invention is made possible by operating at a temperature below 100° C. In this manner highly concentrated solutions of the metal salts of epoxy fatty acids in alkyl phenols can directly be produced. Such solutions represent valuable stabilizers for halogen-containing thermoplastics, such as polyvinyl chloride and its copolymers. Surprisingly it was found that such metal salts produced in the presence of alkyl phenols are of a considerably better solubility than metal salts of epoxy fatty acids produced according to known processes, i.e. for instance, by metathetical reaction. Thus the process of producing metal soaps of epoxy fatty acids in alkyl phenols permits the production of higher concentrated solutions as they can be obtained by dissolving metal soaps of epoxy fatty acids as obtained in the known manner.

Suitable oxides and hydroxides for carrying out the process according to the present invention are the oxides or hydroxides of alkali metals, alkaline earth metals, beryllium, zinc, nickel, manganese, tin, cobalt, cerium, bismuth, and lead.

The carbonates of such metals and their salts with weakly acid organic acids which are volatile under the reaction conditions, i.e. at a temperature below 100° C. and under reduced pressure, may also be used. Such volatile organic acids are, for instance, formic acid, acetic acid, and the like acids.

Epoxy fatty acids or their ester with monohydric or polyhydric alcohols are obtained by epoxidizing, in a manner known per se, the ethylene linkage or ethylene linkages of naturally occuring unsaturated fatty acids or their esters, for instance, with glycerol or lower aliphatic alcohols such as methanol and ethanol. Examples of suitable unsaturated fatty acids for such epoxidizing process include oleic acid, hexadecenoic acid, also known as palmitoleic acid, ricinoleic acid, linoleic acid, and the like unsaturated fatty acids.

When preparing metal soap solutions which contain, in addition to the metal soaps according to the present invention, metal salts of other carboxylic acids, for instance, of naphthenic acid or of branched-chain aliphatic carboxylic acids, it is the preferred procedure to first prepare the soaps of said last-mentioned acids by reaction thereof with the oxides or hydroxides of the above mentioned metals or with their salts with volatile organic acids in alkyl phenols as reaction medium, whereafter the epoxy fatty acid or its ester is added and also reacted with the metal compound at a moderate temperature. Suitable branched-chain aliphatic carboxylic acids the metal salts of which may be used together with the metal salts of the epoxidized fatty acids as stabilizers include, for instance, $\alpha$- or $\beta$-branched aliphatic carboxylic acids having 5 to 7 carbon atoms in a straight chain. Examples of such acids are $\alpha$-ethyl hexanoic acid, $\alpha$-methyl heptanoic acid, $\alpha$-methyl valeric acid, or the corresponding $\beta$-branched acids, or the synthetic, highly branched or cyclic aliphatic carboxylic acids having 9 to 19 carbon atoms and preferably 9 to 11 carbon atoms. These synthetic acids, known as "Koch acids", are obtained by addition of carbon monoxide and water to higher olefins according to the Koch process described, for instance, in German Patent No. 942,937 and in "Fette, Seifen, Anstrichmittel" vol. 59, pages 493–498 (1957). Esters of these acids or of the epoxidized fatty acids can be used in this reaction only when employing basically reacting metal compounds such as barium hydroxide, lithium carbonate, or the like for metal salt formation.

Examples of alkyl phenols which are suitable as reaction medium in the process according to the present invention include 2-isopropyl phenol, 2-methyl-4-tertiary propyl phenol, 2,4-dimethyl phenol, 2,5-dimethyl phenol, p-nonyl phenol, and the like phenols. The reaction temperature is kept below 100° C. and preferably between about 50° C. and about 60° C. After the main reaction has ceased, the reaction water or the volatile acids formed thereby, are removed by applying vacuum to the reaction vessel. As a result thereof, the saponification equilibrium reaction is simultaneously terminated. The resultant solutions of the thus obtained metal soaps in alkyl phenols may be of varying concentration, generally ranging between about 50% and about 70% depending upon the reaction components used in this reaction. Such highly concentrated solutions could not be obtained heretofore. They may subsequently be adjusted to the desired concentration by adding thereto organic solvents such as plasticizers, extenders, hydroxyl groups-containing aliphatic compounds, and gel-breaking additives and by filtering off any residual metal oxide or suspended matter while the solution is still at moderately increased temperature.

Suitable supplementary solvents are, for instance, hydroxyl groups-containing aliphatic compounds such as aliphatic saturated and unsaturated polyalcohols, or amino alcohols having at least two hydroxyl groups, their partial esters or ethers containing at least one free hydroxyl group, for instance, glycol, glycerol, glycerol mono-oleate, glycol diethyl ether, propylene glycol, hexylene glycol, hexyne diol, triethanolamine, epoxidized oils, such as epoxidized soybean oil, and epoxidized esters of unsaturated fatty acids.

Other suitable additives are phosphite compounds, non-volatile triesters of phosphorous acid of the formula $P(OR)_3$ wherein R may be alkyl or aryl. Such compounds are, for instance, triphenyl phosphite, mono-octyl diphenyl phosphite, trioctyl phosphite, mono-octyl propylene glycol phosphite, and the like phosphites.

The viscosity of the metal soap solution may be adjusted by the addition of suitable organic solvents which are dependent upon the type of metal compounds to be dissolved. Mineral oils having a high naphthene and paraffin content are the preferred solvents of this type in cases where the conventional plasticizer cannot be used.

The following examples serve to illustrate the present invention without, however, limiting the same thereto.

*Example 1*

240.8 g. of nonyl phenol are heated to about 50° C. and mixed with 138 g. of a $C_9$-$C_{11}$ Koch acid. Then the calculated amount of cadmium oxide (46.8 g.) is added in portions while stirring and the temperature is increased to 80° C. The reaction is easily initiated by added a few mls. of water. Upon completion of the reaction, 301 g. of epoxy stearic acid and, in portions, further 64 g. of cadmium oxide are added. The temperature is maintained at 80° C. The water formed in the reaction and the added water is distilled off under vacuum. The resultant solution is mixed with 80 g. of triphenyl phosphite and 35.6 g. of hexylene glycol at a temperature of 70° C. To remove traces of unreacted cadmium oxide and suspended particles, it is mixed with a filter aid, stirred thoroughly and subjected to suction filtration in hot state. The resultant liquid cadmium stabilizer has a metal content of 10.9% and a viscosity of 23,400 cp. at 10° C.

*Example 2*

212.5 g. of nonyl phenol were mixed with 129 g. of $\alpha$-ethyl hexanoic acid and 36.6 g. of zinc oxide were added to the mixture in portions at a temperature between 60° C. and 70° C. while stirring. Then 284 g. of epoxy stearic acid were added and additional 40.7 g. of zinc oxide were strewed in. Upon completion of the reaction, 70.9 g. of triphenyl phosphite and 31.5 g. of hexylene glycol were added at 60° C. A zinc soap solution having a metal content of 7.8% and a viscosity of 22,819 cp. at 20° C. was obtained after filtration.

*Example 3*

290 g. of epoxidized castor oil were mixed with 772 g. of nonyl phenol at 80° C. while stirring and 157 g. of barium hydroxide $Ba(OH)_2.8H_2O$ were added in small portions to the mixture. In doing so, the next portion was not added before the previously added barium hydroxide had completely reacted. After the reaction of the epoxidized castor oil with the metal hydroxide was complete, 284 g. of epoxy stearic acid and the corresponding amount of barium hydroxide (157 g.) were added. The reaction temperature in this second step was also maintained at 80° C. The water formed was subsequently distilled off in vacuo. After addition of 193 g. of triphenyl phosphite and 87.8 g. of hexylene glycol, the solution was treated with a filter aid and subjected to suction filtration to remove suspended particles. The finished solution had a metal content of 7.8% and a viscosity of 13,796 cp. at 20° C.

*Example 4*

386.6 g. of a mixture of 2,4- and 2,5-dimethyl phenol were mixed with 125 g. of a $C_9$-$C_{19}$ Koch acid. The mixture was heated to 95–100° C. and at this temperature, mixed with 74.3 g. of lead oxide added in portions. Upon completion of the reaction, the solution was cooled to 75–80° C. and mixed with 284 g. of epoxy stearic acid which was reacted with additional 111.6 g. of lead oxide. The reaction solution was processed in the manner described in the preceding examples. The finished metal soap solution had a metal content of 17.8% and a viscosity of 3,677 cp. at 20° C.

*Example 5*

168.5 g. of $\alpha$-ethyl hexanoic acid are mixed at 80° C. with 286 g. of nonyl phenol, while stirring. 32.7 g. of calcium oxide are added thereto in small portions. After addition of each portion, stirring is continued until the added calcium oxide has completely reacted. The reaction can readily be initiated by the addition of a few cc. of water. After reaction of α-ethyl hexanoic acid with the metal oxide is completed, there are added 355 g. of epoxy stearic acid methyl ester as well as 35.5 g. of calcium oxide required for the reaction with said ester. In this second reaction step, the temperature is also kept at 80° C. After reaction is completed, the water formed during reaction and the added water are distilled off in a vacuum. 95.3 g. of triphenyl phosphite and 47.6 g. of hexyl glycol are added to the resulting solution at a temperature of 70° C. The mixture is well stirred and filtered off by suction while still hot. The resulting liquid calcium soap stabilizer has a metal content of 4.87% and a viscosity of 16,490 cp. at 30° C.

*Example 6*

172.5 g. of a $C_9$–$C_{11}$ Koch acid are mixed at about 50° C. with 370 g. of nonyl phenol. 84 g. of nickel acetate are added thereto in small portions. The temperature is slowly increased to 80° C. After reaction of the nickel salt is completed, 360 g. of epoxy stearic acid are added followed by the addition of 122.5 g. of nickel acetate required for said acid. To achieve complete reaction, the temperature is increased to 90–100° C. The acetic acid formed thereby is distilled off in a vacuum. The resulting solution is mixed at 70° C. with 90 g. of triphenyl phosphite and 40 g. of hexylene glycol while stirring vigorously. The resulting nickel soap solution has a metal content of 6.8% and a viscosity of 28,970 cp. at 30° C.

*Example 7*

270 g. of a mixture of 2,4- and 2,5-dimethyl phenol are mixed with 173 g. of a $C_9$–$C_{11}$ Koch acid. At a temperature between 80° C. and 90° C. 118.7 g. of cobaltous acetate $Co(CH_3COO)_2 \cdot 4H_2O$ are added thereto in small portions at a temperature between 80° C. and 90° C. After the reaction is completed, 359 g. of epoxy stearic acid are added thereto at 80° C. followed by the addition of 173 g. of cobaltous acetate in small portions. The water and the acetic acid formed during the reaction are distilled off in a vacuum. 90 g. of triphenyl phosphite and 40 g. of hexylene glycol are added thereto at about 70° C. The resulting solution has a metal content of 6.9% and a viscosity of 11,500 cp. at 30° C.

*Example 8*

270 g. of nonyl phenol are heated to about 80° C. 182 g. of a $C_{15}$–$C_{19}$ Koch acid are admixed thereto and the mixture is reacted with the calculated amount of manganese acetate (57.3 g.). The manganese acetate is added in small portions at a temperature between 70° C. and 90° C. After the reaction is completed, 382 g. of epoxy stearic acid are added followed by the addition of 120 g. of manganese acetate in small portions. Thereby, the temperature is kept between about 70° C. and about 90° C. The acetic acid formed thereby is distilled off in a vacuum and 90 g. of triphenyl phosphite and 40 g. of hexylene glycol are added to the resulting solution at a temperature of about 70° C. The mixture is well stirred. The resulting metal soap solution has a metal content of 5.6% and a viscosity of 11,280 cp. at 40° C.

*Example 9*

245.5 g. of nonyl phenol are mixed with 132.5 g. of a $C_9$–$C_{11}$ Koch acid. The mixture is heated to 85–95° C. 115.5 g. of barium hydroxide $Ba(OH)_2 \cdot 8H_2O$ are added at said temperature. After reaction is completed, 294 g. of epoxidized linseed oil are added thereto at about 70° C. followed by the addition of 163 g. of barium hydroxide. After reaction is completed, the water formed thereby is distilled off in a vacuum. 81.8 g. of triphenyl phosphite, 36.4 g. of hexylene glycol, and 91 g. of polyglycol (molecular weight: 200) are added to said solution which is then filtered off in order to remove any solid matter present therein. The resulting solution has a metal content of 12.1% and a viscosity of 11,500 cp. at 40° C.

*Example 10*

172 g. of a $C_9$–$C_{11}$ Koch acid are added to 270 g. of nonyl phenol. Thereafter, 36.4 g. of copper oxide are admixed thereto in small portions at 80° C. After reaction is completed, 360 g. of epoxy stearic acid are added and 51.8 g. of copper oxide are then admixed in small portions while the temperature is kept at 80° C. After reaction is completed, the water formed thereby is distilled off in a vacuum. 90 g. of triphenyl phosphite and 40 g. of hexylene glycol are added thereto. The resulting solution has a metal content of 7% and a viscosity of 397 cp. at 20° C.

*Example 11*

142 g. of naphthenic acid are added to 379.5 g. of nonyl phenol and the mixture is heated to 80° C. 52 g. of lead oxide are added in small portions thereto. After reaction is completed, 277 g. of epoxy stearic acid are admixed thereto followed by 111.5 g. of lead oxide added in small portions as required for reaction with said epoxy stearic acid. After reaction is completed, 406 g. of "Mobilsol L" are added at a temperature of 70° C. The mixture is filtered in order to remove impurities. The resulting stabilizer solution has a metal content of 11% and a viscosity of 1,500 cp. at 20° C.

*Example 12*

370 g. of nonyl phenol are mixed with 356 g. of a $C_9$–$C_{11}$ Koch acid at a temperature of 80–85° C. 78.7 g. of sodium hydroxide are added thereto in small portions. After reaction is completed, 92.2 g. of epoxy stearic acid and 14.3 g. of sodium hydroxide are added in small portions. Thereafter, the water formed in said reaction is distilled off in a vacuum. 90 g. of triphenyl phosphite and 40 g. of hexylene glycol are added with stirring at a temperature of 70° C. The resulting solution has a metal content of 5.3% of sodium and a viscosity of 8,520 cp. at 30° C.

As stated hereinabove, the metal soap solutions according to the present invention are advantageously used for stabilizing halogen-containing polymers such as polyvinyl chloride and its copolymers. The compositions according to the above indicated examples were tested for their usefulness as polyvinyl chloride stabilizers in the following manner:

Two parts of the liquid stabilizer compositions as prepared according to Examples 1 to 4 were admixed to a test mixture composed of 100 parts of suspension polyvinyl chloride of the K-value 70 and of 50 parts of dioctyl phthalate by milling on a set of milling rolls at 170° C. for ten minutes. The plasticized mixture was then drawn to foils and samples of such foils were kept exposed to the atmosphere in a drying oven at 180° C. By removing test pieces therefrom at intervals of 10 minutes, the time was determined when discoloration of the sample from colorless to yellowish brown was observed. The following table illustrates the results achieved in these stability tests:

| Test No. | Stabilizing agent | Heat stability at 180° C. (min.) |
| --- | --- | --- |
| 1 | 2 parts of composition of Example 1 | 50 |
| 2 | 1 part of composition of Example 1 and 1 part of composition of Example 3 | 80 |
| 3 | 1.5 parts of composition of Example 3, 1.4 parts of composition of Example 1, and 1.1 part of composition of Example 2 | 60 |
| 4 | 2 parts of composition of Example 4 | 60 |
| 5 | Control without stabilizer | 10 |

We claim:

1. A process of producing solutions of metal soaps of epoxidized fatty acids in an alkyl phenol, the steps which comprise (a) mixing an epoxy compound obtained by epoxidizing (1) a fatty acid selected from the group consisting of oleic acid, hexadecenoic acid, ricinoleic acid, and linoleic acid, (2) a lower hydrocarbon alcohol ester of any of said fatty acids, (3) a glycerol ester of any of said fatty acids, (4) castor oil, or (5) linseed oil.

(b) with a soap-forming metal compound selected from the group consisting of an oxide, hydroxide, carbonate, or salt of a weakly acid organic acid of alkali metal, alkaline earth metal, cadmium, zinc, lead, nickel, cobalt, manganese, copper, beryllium, tin, cerium, and bismuth, said weakly-acid organic acid being volatile under reduced pressure below 100° C., in an alkyl phenol capable of use as a reaction medium and diluting agent during formation of said metal soaps, carrying out said mixing at an elevated temperature below about 100° C., stirring the mixture at said temperature until salt formation is completed, and distilling off volatile reaction products in a vacuum.

2. The process according to claim 1 wherein the viscosity of the resulting metal soap solution in an alkyl phenol is reduced by the addition of an organic solvent selected from the group consisting of ethylene glycol, glycerol, glycerol mono-oleate, glycol diethyl ether, propylene glycol, hexylene glycol, hexyne diol, triethanolamine epoxidized soybean oil, and a mineral oil having a high naphthene and paraffin content.

3. The process according to claim 1 wherein the viscosity of the resulting metal soap solution in an alkyl phenol is reduced by the addition of a gel-breaking compound selected from the group consisting of triphenyl phosphite, mono-octyl diphenyl phosphite, trioctyl phosphite, and mono-octyl propylene glycol phosphite.

4. The process according to claim 1 wherein the epoxy fatty acid compound is an epoxy fatty acid compound with 16 to 18 carbon atoms in the epoxy fatty acid moiety.

5. The process according to claim 1 wherein the soap-forming metal compound is a metal compound selected from the group consisting of an alkali metal, an alkaline earth metal, beryllium, zinc, cadmium, nickel, manganese, tin, cerium, cobalt, and lead.

6. The process according to claim 5, wherein the epoxy fatty acid compound is an epoxy fatty acid compound with 16 to 18 carbon atoms in the epoxy fatty acid moiety.

7. In a process of producing a solution of a metal soap of an epoxidized fatty acid in an alkyl phenol, the steps which comprise adding to a solution of a hydrocarbon carboxylic acid compound selected from the group consisting of a branched hydrocarbon carboxylic acid with 6 to 19 carbon atoms selected from the group consisting of α-ethyl hexanoic acid, α-methyl heptanoic acid, and α-methyl valeric acid, corresponding β-branched chain acids of said acids, Koch acids having from 9 to 19 carbon atoms, naphthenic acid, a lower hydrocarbon alcohol ester of any of said acids, and a glycerol ester of any of said acids in an alkyl phenol capable of use as a reaction medium and diluting agent during formation of said metal soaps a soap-forming metal compound selected from the group consisting of an oxide, hydroxide, carbonate, or salt of a weakly-acid organic acid of alkali metal, alkaline earth metal, cadmium, zinc, lead, nickel, cobalt, manganese, copper, beryllium, tin, cerium, and bismuth, said weakly-acid organic acid being volatile under reduced pressure below 100° C., carrying out said adding at elevated temperature below about 100° C., maintaining the resulting mixture at said temperature to cause formation of the respective metal soap, adding thereto an epoxy fatty acid compound obtained by epoxidizing (1) a fatty acid selected from the group consisting of oleic acid, hexadecenoic acid, ricinoleic acid, linoleic acid, (2) a lower hydrocarbon alcohol ester of any of said fatty acids, (3) a polyhydric alcohol ester of any of said fatty acids, (4) castor oil, or (5) linseed oil, admixing to the resulting mixture a soap forming metal compound selected from the group defined above, carrying out said admixing, at said elevated temperature, maintaining the resulting mixture at said temperature to form the metal salt of said epoxy fatty acid compound, and removing the volatile reaction product by vacuum distillation from the reaction mixture.

8. The process according to claim 7 wherein the branched hydrocarbon carboxylic acid compound is a highly branched carboxylic acid having 9 to 19 carbon atoms.

9. The process according to claim 7 wherein the branched hydrocarbon carboxylic acid is a highly branched hydrocarbon carboxylic acid having 9 to 11 carbon atoms.

10. The process according to claim 7 wherein the epoxy fatty acid compound is an epoxy fatty acid compound with 16 to 18 carbon atoms in the epoxy fatty acid moiety.

11. The process according to claim 7, wherein the branched hydrocarbon carboxylic acid is a branched hydrocarbon carboxylic acid with 6 to 19 carbon atoms.

12. In a process of producing solutions of metal soaps of epoxidized fatty acids in an alkyl phenol, the steps which comprise
(a) mixing an epoxy compound obtained by epoxidizing (1) a fatty acid selected from the group consisting of oleic acid, hexadecenoic acid, ricinoleic acid, and linoleic acid; (2) a lower hydrocarbon alcohol ester of any of said fatty acids; (4) castor oil, or (5) linseed oil,
(b) with a soap forming metal compound selected from the group consisting of an oxide, hydroxide, carbonate, or salt of a weakly-acid organic acid of alkali metal, alkaline earth metal, cadmium, zinc, lead, nickel, cobalt, manganese, copper, beryllium, tin, cerium, and bismuth, said weakly-acid organic acid being volatile under reduced pressure below 100° C.,
(c) in an alkyl phenol selected from the group consisting of 2-isopropyl phenol, 2-methyl-4-tertiary propyl phenol, 2,4-dimethyl phenol, 2,5-dimethyl phenol, and p-nonyl phenol,
(d) at an elevated temperature below about 100° C.,
(e) stirring the mixture at said temperature until salt formation is completed, and
(f) distilling off volatile reaction products in a vacuum.

13. The process according to claim 12 wherein the soap-forming metal compound is selected from the group consisting of cadmium oxide, zinc oxide, barium hydroxide, lead oxide, calcium oxide, nickel acetate, cobaltous acetate, manganese acetate, copper oxide, sodium hydroxide, and lithium carbonate.

14. The process according to claim 12 wherein the viscosity of the produced solution is reduced by the addition of an organic solvent selected from the group consisting of ethylene glycol, glycerol mono-oleate, glycol diethyl ether, propylene glycol, hexylene glycol, hexyne diol, triethanolamine, epoxidized soybean oil, and a mineral oil having a high naphthene and paraffin content.

15. The process according to claim 12 wherein the viscosity of the produced solution is reduced by the addition of a gel-breaking compound selected from the group consisting of triphenyl phosphite, mono-octyl diphenyl phosphite, trioctyl phosphite, and mono-octyl propylene glycol phosphite.

16. In a process of producing a solution of a metal soap of an epoxidized fatty acid in a phenol, the steps which comprise
(a) adding to a solution of a branched hydrocarbon carboxylic acid compound with 6 to 19 carbon atoms selected from a group consisting of α-ethyl hexanoic acid, α-methyl heptanoic acid, and α-methyl valeric acid, corresponding β-branched chain acids of said acids, Koch acids having from 9 to 19 carbon atoms, naphthenic acid, a lower hydrocarbon alcohol ester of any of said acids and a glycerol ester of any of said acids, (b) in an alkyl phenol selected from the group consisting of 2-isopropyl phenol, 2-methyl-4-tertiary propyl phenol, 2,4-dimethyl phenol, 2,5-dimethyl phenol, and p-nonyl phenol, (c) a soap forming metal compound selected from the group consisting of an oxide, hydroxide, carbonate, or salt of a weakly-acid organic acid of alkali metal, alkaline earth metal, cadmium, zinc, lead, nickel, cobalt, manganese, copper, beryllium, tin, cerium, and bismuth, said weakly-acid organic acid being volatile under reduced pressure below 100° C., (d) at an elevated temperature below about 100° C., (e) maintaining the resulting mixture at said temperature to cause formation of the respective metal soap, (f) adding thereto an epoxy compound obtained by epoxidizing (1) a fatty acid selected from the group consisting of oleic acid, hexadecenoic acid, ricinoleic acid, and linoleic acid, (2) a lower hydrocarbon alcohol ester of any of said fatty acids, (3) a glycerol ester of any of said fatty acids, (4) castor oil, or linseed oil, (g) admixing to the resulting mixture a soap-forming metal compound selected from step (c) above, (h) at said elevated temperature, (i) maintaining the resulting mixture at said temperature to form the metal salt of said epoxy compound, and (j) removing the volatile reaction product by vacuum distillation from the reaction mixture.

17. The process according to claim 16 wherein the branched hydrocarbon carboxylic acid is a Koch acid having from 9 to 19 carbon atoms.

References Cited

UNITED STATES PATENTS

| | | | |
|---|---|---|---|
| 2,824,847 | 2/1958 | Fath | 260—348 X |
| 3,004,000 | 10/1961 | Kauder et al. | 252—400 X |
| 3,112,325 | 11/1963 | Maurate et al. | 260—348 X |
| 3,182,034 | 5/1965 | Van Hook | 260—348 X |

FOREIGN PATENTS 825,691  12/1959  Great Britain.

LEON D. ROSDOL, *Primary Examiner.*

JULIUS GREENWALD, DONALD E. CZAJA,
*Examiners.*

M. WEINBLATT, *Assistant Examiner.*